(12) United States Patent
Ding et al.

(10) Patent No.: US 11,948,021 B2
(45) Date of Patent: Apr. 2, 2024

(54) METHOD FOR INTER-CORE COMMUNICATION, PROCESSOR, INTER-CORE COMMUNICATION SYSTEM AND COMPUTER READABLE STORAGE MEDIUM

(71) Applicant: Black Sesame Technologies Inc., San Jose, CA (US)

(72) Inventors: Ning Ding, Chengdu (CN); Wenjian Gou, Chengdu (CN)

(73) Assignee: Black Sesame Technologies Inc., San Jose, CA (US)

(*) Notice: Subject to any disclaimer, the term of this patent is extended or adjusted under 35 U.S.C. 154(b) by 15 days.

(21) Appl. No.: 17/702,536

(22) Filed: Mar. 23, 2022

(65) Prior Publication Data

US 2022/0308947 A1    Sep. 29, 2022

(30) Foreign Application Priority Data

Mar. 26, 2021    (CN) .......................... 202110324554.7

(51) Int. Cl.
*G06F 9/54*     (2006.01)
*G06F 13/36*    (2006.01)
*G06F 15/80*    (2006.01)

(52) U.S. Cl.
CPC .............. *G06F 9/546* (2013.01); *G06F 13/36* (2013.01); *G06F 15/80* (2013.01)

(58) Field of Classification Search
None
See application file for complete search history.

(56) References Cited

U.S. PATENT DOCUMENTS

| | | | | | |
|---|---|---|---|---|---|
| 5,748,962 | A | * | 5/1998 | Brechtel | ................. G06F 9/465 713/1 |
| 2004/0057458 | A1 | * | 3/2004 | Kil | ........................ H04L 69/161 370/466 |

(Continued)

FOREIGN PATENT DOCUMENTS

| CN | 1441366 A | * | 9/2003 |
|---|---|---|---|
| CN | 1441366 A | | 9/2003 |

(Continued)

*Primary Examiner* — Charles E Anya
(74) *Attorney, Agent, or Firm* — Timothy Wang; Ni, Wang & Massand, PLLC

(57) ABSTRACT

The present disclosure relates to a method for inter-core communication of a multi-core processor, a processor, an inter-core communication system and a computer readable storage medium. The method for inter-core communication comprises: receiving a communication request sent by an initiating core for communication with receiving cores; and instructing, on the basis of the communication request, the initiating core to communicate with the receiving cores by using a delivery message to invoke interfaces of services in the receiving cores; wherein the delivery message is service-oriented and corresponds to the interfaces of the services in the receiving cores. According to the method for inter-core communication of the present disclosure, services built in various systems can interact in a uniform and universal manner by means of the service-oriented delivery message. Therefore, the portability of application programs located on different cores can be improved, and the development difficulty is reduced.

12 Claims, 8 Drawing Sheets

(56) References Cited

U.S. PATENT DOCUMENTS

2009/0198781 A1* 8/2009 Leggett .................. G06F 9/546
709/206
2012/0281706 A1* 11/2012 Agarwal ............. H04L 12/4633
370/395.53
2013/0145375 A1* 6/2013 Kang .................. G06F 9/45558
718/104

FOREIGN PATENT DOCUMENTS

| CN | 101256519 A |   | 9/2008 |              |
|----|-------------|---|--------|--------------|
| CN | 101262501 A | * | 9/2008 | ............. H04L 29/08 |
| CN | 101354693 A |   | 6/2010 |              |
| CN | 102915256 A |   | 2/2013 |              |
| CN | 103729329 A |   | 4/2014 |              |
| CN | 107608755 A |   | 1/2018 |              |
| CN | 110928828 A | * | 3/2020 | ............. G06F 11/08 |
| CN | 110928828 A |   | 3/2020 |              |

* cited by examiner

| 0 | 1 | 2 | 3 | 7 | 8 | 15 | 16 | 31 | 32 | 64 |
|---|---|---|---|---|---|---|---|---|---|---|
| Type | Wake up | | ACK | | Param 1 | | Param 2 | | Param 3 | |
| 01 Method | 0 disable | | 5bit | | 1 Byte, | | 2 Bytes, | | 4 Bytes, | |
| 10 Reply | 1 enable | | | | CMD | | Short param | | Long param | |
| 11 Signal | | | | | | | | | | |

FIG. 4

METHOD FOR INTER-CORE COMMUNICATION, PROCESSOR, INTER-CORE COMMUNICATION SYSTEM AND COMPUTER READABLE STORAGE MEDIUM

CROSS REFERENCE TO RELATED APPLICATION

This patent application claims the benefit and priority of Chinese Patent Application No. 202110324554.7 filed on Mar. 26, 2021, the disclosure of which is incorporated by reference herein in its entirety as part of the present application.

TECHNICAL FIELD

The present disclosure relates to the field of communications technologies, and in particular, to a method for inter-core communication of a multi-core processor, a processor, an inter-core communication system, and a computer readable storage medium.

BACKGROUND ART

A multi-core processor refers to integrating multiple processor cores on a single chip. The multi-core processor can provide high processor performance and efficient power utilization at a low dominant frequency, and occupies a small physical space, and therefore is widely applied in various fields.

The development of the multi-core processor inevitably drives development of a multi-core operating system. An efficient inter-core communication mechanism is a critical part of the multi-core operating system. In existing inter-core communication schemes, communication is generally performed in a point-to-point manner, that is, cores communicating with each other perform communication on a one-to-one basis by means of underlying interfaces. As the programming interfaces of the application programs between different cores are not uniform, the change of the hardware and the operating system may cause the application programs to be disabled, resulting in poor portability of the application programs and great implementation difficulty of codes. In addition, the degree of coupling between different cores is relatively high, resulting in high system maintenance costs.

SUMMARY

In view of this, in order to solve the problems of low communication efficiency and poor portability of existing inter-core communication mechanisms, it is necessary to provide a method for inter-core communication of a multi-core processor, a processor, an inter-core communication system and a computer readable storage medium.

According to a first aspect of the present disclosure, provided is a method for inter-core communication of a multi-core processor, the multi-core processor comprising a plurality of processor cores, among which an initiating core initiates communication with receiving cores, wherein the method comprises:
receiving a communication request sent by the initiating core for communication with the receiving cores; and
instructing, on the basis of the communication request, the initiating core to communicate with the receiving cores by using a delivery message to invoke interfaces of services in the receiving cores;
wherein the delivery message is service-oriented and corresponds to the interfaces of the services in the receiving cores.

In one of the embodiments, the initiating core comprises an invoking interface, the invoking interface being used to invoke the services in the receiving cores; and the invoking interface of the initiating core and the interfaces of the services in the receiving cores have a uniform interface format and a uniform communication protocol.

In one of the embodiments, the code to implement invocation of the initiating core, the code to implement invocation of the services in the receiving cores and the code to implement invocation, parsing and routing of the delivery message are uniformly generated by a code generator.

In one of the embodiments, the method further comprises:
allocating, according to a predetermined rule, hardware resources required for communication between the initiating core and the receiving cores to the initiating core and the receiving cores.

In one of the embodiments, instructing, on the basis of the communication request, the initiating core to communicate with the receiving cores by using a delivery message to invoke interfaces of services in the receiving cores comprises:
sending a communication notification to the receiving cores on the basis of the communication request, the communication notification being used to instruct the receiving cores to read a delivery message delivered by the initiating core to the receiving cores;
receiving response information sent by the receiving cores after reading the delivery message; and
sending communication completion information to the initiating core on the basis of the response information.

In one of the embodiment, a plurality of receiving cores exist, and the method further comprises:
periodically receiving load status information sent from each of the receiving cores;
determining, on the basis of the load status information, a first receiving core of the plurality of receiving cores to receive the communication notification; and
sending the communication notification only to the first receiving core to instruct the first receiving core to read a delivery message delivered by the initiating core to the receiving cores.

In one of the embodiments, prior to receiving a communication request sent by the initiating core for communication with the receiving cores, the delivery message is stored in a register of the initiating core, and a counter field in the delivery message is set to the number of the receiving cores; and
the communication notification is further used to instruct the receiving cores to modify the delivery message so as to decrease the counter field in the delivery message by 1 and to overwrite the modified delivery message into the register.

In one of the embodiments, the method further comprises:
receiving lock information sent by the receiving cores after receiving the notification information, wherein the lock information indicates that the receiving cores execute a lock operation on the register, and only the receiving cores executing the lock operation on the register can read/write data from/into the register; and
prior to receiving response information sent by the receiving cores after reading the delivery message, the method further comprises:

receiving unlock information sent by the receiving cores after modifying the delivery information, the unlock information being used to indicate that the register is unlocked, so as to allow other receiving cores to read/write data from/into the register.

In one of the embodiments, the notification completion information is used to instruct the initiating core to check whether the counter field of the delivery message stored in the register is 0; and the method further comprises:

if the counter field is 0, causing the initiating core to store a next delivery message into the register.

According to a second aspect of the present disclosure, provided is a processor, configured to execute a computer program stored on a memory, wherein the processor executes the computer program to implement the method for inter-core communication.

In one of the embodiments, the processor is one of the plurality of processing cores of the multi-core processor.

In one of the embodiments, the processor is a scheduling processor, the scheduling processor being used to schedule resources of the plurality of processing cores of the multi-core processor.

According to a third aspect of the present disclosure, provided is an inter-core communication system, comprising the processor according to the claims, and the initiating core and the receiving cores.

According to a fourth aspect of the present disclosure, provided is a non-volatile computer readable storage medium, storing a computer program, and the computer program, when executed, causing a processor to implement the method for inter-core communication.

According to the method for inter-core communication of a multi-core processor, the processor, the inter-core communication system and the computer readable storage medium, the initiating core communicates with the receiving cores by using a delivery message to invoke interfaces of services in the receiving cores, and inter-core communication is performed by means of services, so that services built in various systems can interact in a uniform and universal manner by means of the service-oriented delivery message. Therefore, the portability of application programs located on different cores can be improved, and the development difficulty is reduced. In addition, providing uniform programming interfaces and uniform communication protocols for communication of a multi-core system can ensure the consistency of interfaces and protocols of both communication parties, and allow for accurate and convenient inter-core communication.

BRIEF DESCRIPTION OF THE DRAWINGS

FIG. 4 is a schematic diagram of the format of a delivery message according to an embodiment of the present disclosure;

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the embodiments to be described are merely some of rather than all of the embodiments of the present disclosure. All other embodiments obtained by those of ordinary skill in the art based on the embodiments of the present disclosure without paying inventive efforts shall belong to the scope of protection of the present disclosure.

Figure 1:
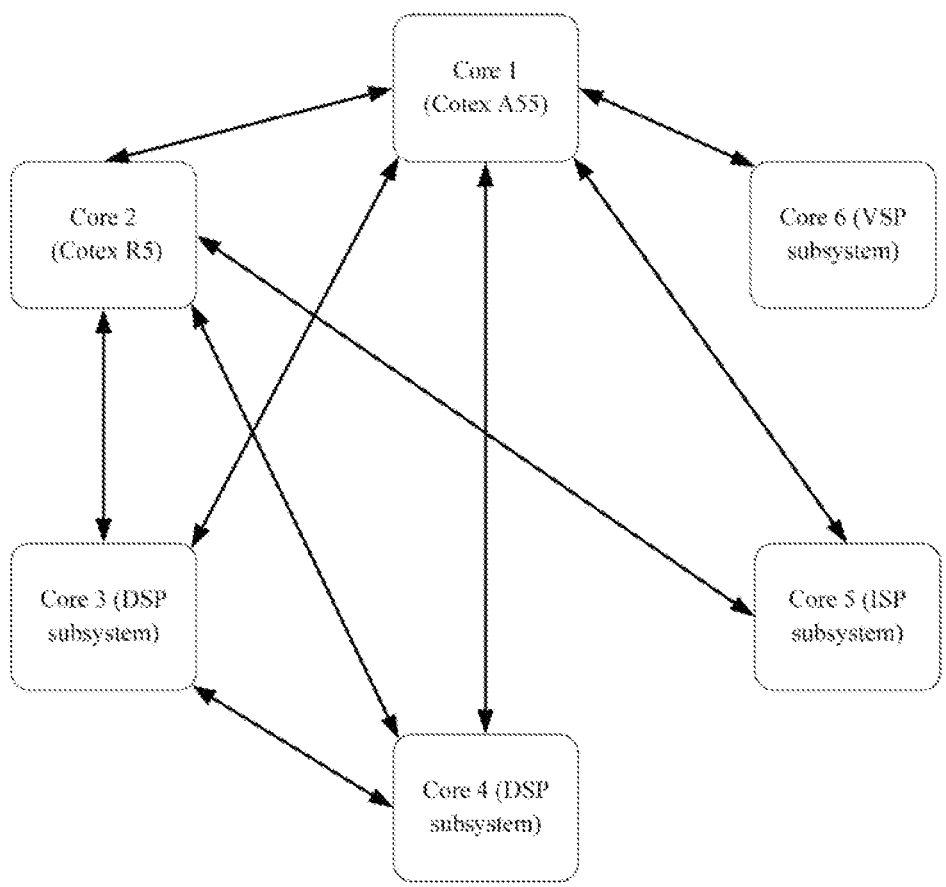
FIG. 1 is a schematic block diagram of existing point-to-point inter-core communication.

FIG. 1 is a schematic block diagram of existing point-to-point inter-core communication. As shown in FIG. 1, the communication system comprises a plurality of cores (a plurality of subsystems). The plurality of cores comprise, for example, a Cotex A55 processor core, a Cotex R5 processor core, a DSP (digital signal processor) subsystem, a VSP (video signal processor) subsystem, an ISP (image signal processor) subsystem, etc. Different services are implemented on the cores, and the cores interact with each other directly in pairs, resulting in a complex invocation situation. The two communication nodes directly use a bottom layer interface to perform point-to-point direct communication. By a shared memory, two cores can access the same memory, and inter-core communication is realized by interrupt coordination and synchronization. In this case, programming interfaces are inconsistent due to different hardware of the subsystems, and an interface protocol needs to be appointed for communication between every two cores, resulting in great development difficulty and poor portability of application programs in cores.

In order to improve the efficiency of inter-core communication, the present disclosure provides a method for inter-core communication of a multi-core processor based on a service-oriented architecture (SOA). A service-oriented architecture is a component model, which divides different functional units (referred to as services) of an application program, and defines good interfaces and protocols among these services for connection. An interface is defined in a neutral manner and should be independent of the hardware platform, operating system and programming language for implementing the service. This enables the services built into a wide variety of systems to interact in a uniform and universal manner. In inter-core communication, a service-oriented architecture is used, and a service is a function provided by the core and presented as a good interface. A service requester (initiating core) enables inter-core communication by invoking interfaces provided by the services in the receiving cores. In this way, inter-core communication has many advantages of the service-oriented architecture, such as coarse granularity, loose coupling, interoperability, and service management.

Figure 2:
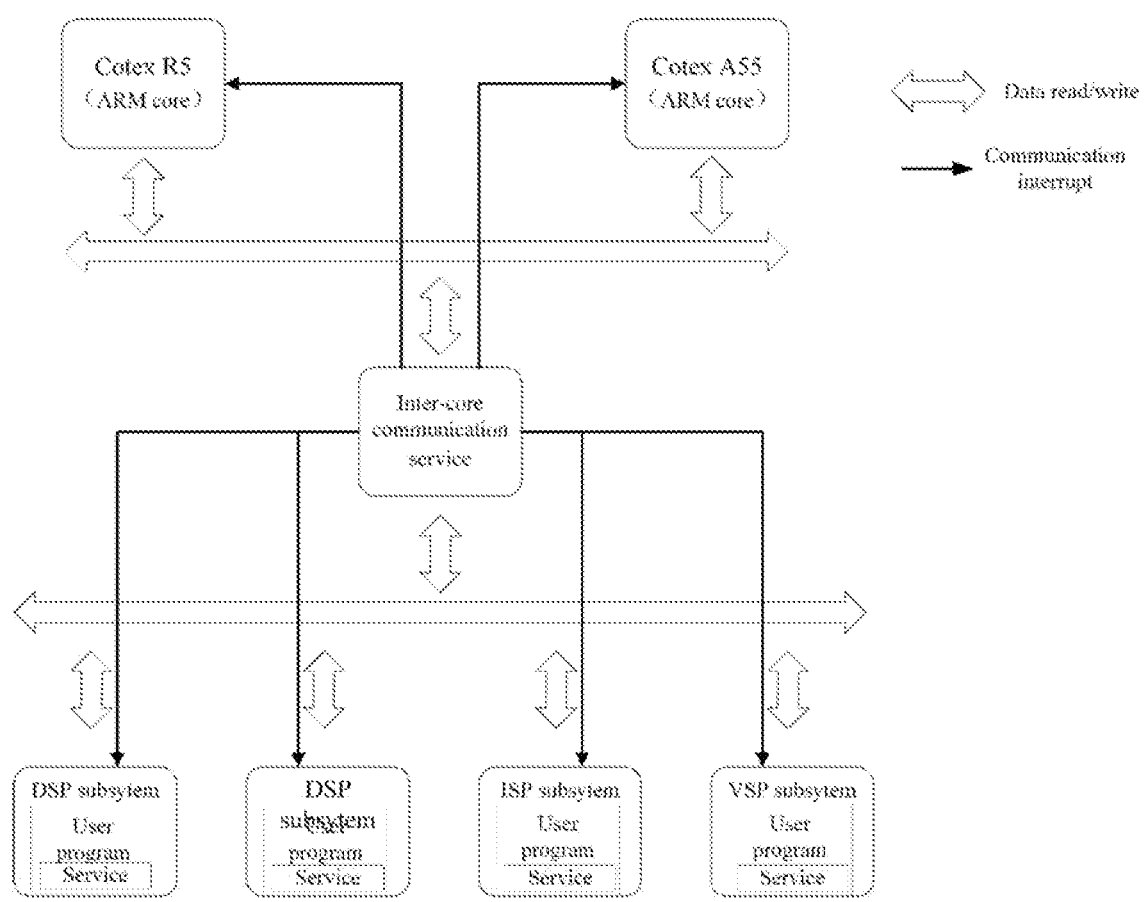
FIG. 2 is an overall architecture diagram of a method for inter-core communication of a multi-core processor according to an embodiment of the present disclosure.

FIG. 2 is an overall architecture diagram of a method for inter-core communication according to an embodiment of the present disclosure. As shown in FIG. 2, a core communicates with another core by means of an inter-core communication service. In the present disclosure, the plurality of cores performing inter-core communication may be a plurality of cores in one processor, and may also be understood as a plurality of IP cores in an SOC (system on chip). In an embodiment of the present disclosure, the initiating core and the receiving cores are all cores in a multi-core processor. In an embodiment, the inter-core communication service is based on a service-oriented architecture, is implemented as a specific communication service process (such as the inter-core communication service in the following), is implemented by a computer program, and is loaded on a core to execute. The service-oriented inter-core communication infrastructure achieves a shared memory and inter-core interrupts. The specific implementation methods of the shared memory and inter-core interrupts are known to those skilled in the art, and are not limited in this description.

Figure 3:
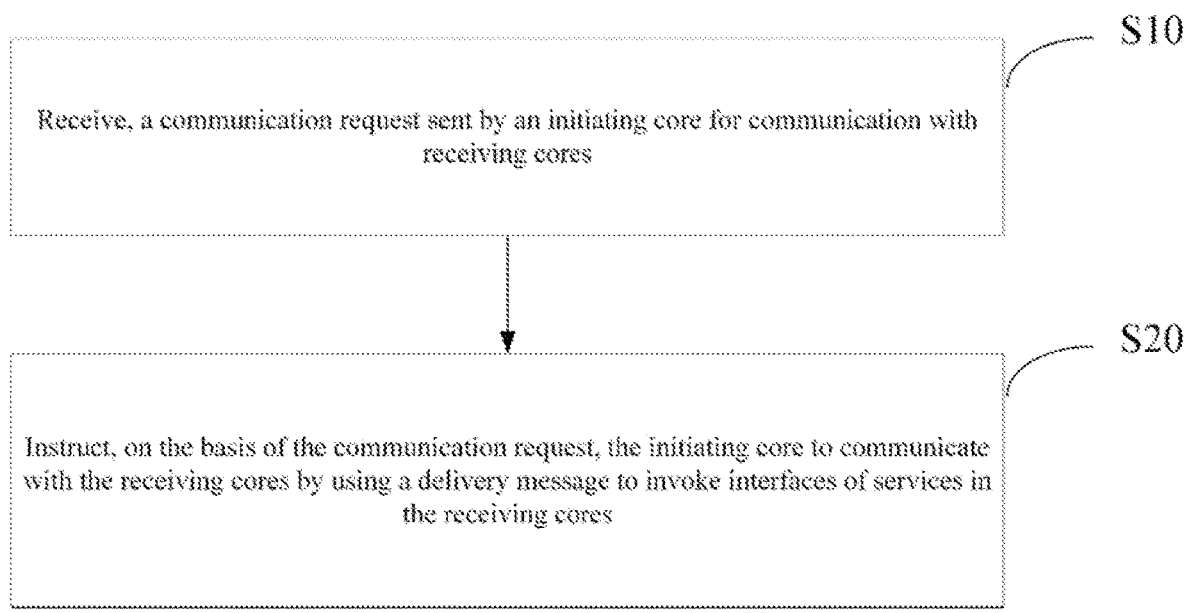
FIG. 3 is a flowchart of a method for inter-core communication of a multi-core processor according to an embodiment of the present disclosure.

FIG. 3 is a flowchart of a method for inter-core communication of a multi-core processor according to an embodiment of the present disclosure. It should be appreciated that execution subjects of the method for inter-core communication of a multi-core processor according to an embodiment of the present disclosure are cores loaded with inter-core communication services.

In step S10, a communication request sent by an initiating core for communication with receiving cores is received; and in step S20, on the basis of the communication request, the initiating core is instructed to communicate with the receiving cores by using a delivery message to invoke interfaces of services in the receiving cores.

Wherein the delivery message is service-oriented and corresponds to the interfaces of the services in the receiving cores.

It should be understood that, in each core, the specific meaning and implementation of a service are defined in a user program, and the service is encapsulated in the form of an interface for use of other applications, and is invoked by other cores to realize inter-core communication. An inter-core communication service provides a common channel for information delivery, and an initiating core invokes interfaces of services in receiving cores through the channel by using a delivery message, so as to invoke the services of the receiving cores. In the service-oriented inter-core communication architecture according to the present disclosure, each core may be used as an initiating core (also referred to as a client core) to request to use services of receiving cores (also referred to as server cores), and may also be used as a receiving core to provide one or more services for use of the initiating core.

When invoking interfaces provided by services in receiving cores by an initiating core, the delivery message corresponding to the invocation is parsed and distributed to the interfaces of the services to be invoked, whereby functions of the interfaces of the services are invoked.

As inter-core communication is performed by means of services, and the delivery message is service-oriented, the degree of coupling between modules of the cores is relatively low, and the entire communication system is easy to maintain.

Referring to FIG. 2 again, the user programs, as receiving cores (server cores), provide some services with certain functions for use of an initiating core (client core). These user programs run on respective cores. Each service has an explicit interface, an explicit method of use, and is encapsulated in a user program. In the service invocation process, the initiating core does not need to know the locations of the receiving cores, implementation details of the services in the receiving cores, etc.

In an embodiment, the initiating core comprises an invoking interface, the invoking interface being used to invoke the services in the receiving cores; and the invoking interface of the initiating core and the interfaces of the services in the receiving cores have a uniform interface format and a uniform communication protocol.

In a preferred embodiment, the invoking interface of the initiating core and the interfaces of the services in the receiving cores are defined by an interface description language (IDL). The interfaces are described by the interface description language in a neutral manner, so that objects running on different platforms and programs written in different languages can communicate with each other. Using an interface description language to provide uniform interfaces can provide simple and efficient programming interfaces, reduce the coding difficulty, reduce the introduction of code errors, and improve the portability of programs. In addition, service protocols in different cores are also defined by using an interface description language, thereby ensuring consistency of interfaces and protocols of both communication parties.

Because the cores have the uniform interface format and the uniform communication protocol, a developer does not need to program a communication process, but only needs to program the specific implementations of services, thereby realizing separation of service logic and communication logic. In a process of inter-core communication, there is no need to pair the cores in correlations in advance, and the specific communication protocol also does not need to be predetermined for specific cores, thereby reducing the risk of communication failure caused by communication protocol mismatch.

In an embodiment, the format of the delivery message is shown in FIG. 4. Referring to FIG. 4, in this embodiment, the length of a delivery message is 64 bits, which includes six fields: Type, Wake-up, ACK, Param 1, Param 2, and Param 3.

As shown in FIG. 4, the field Type occupies two bits for indicating the type of the delivery message received by the service. The types of the delivery messages are, for example, Method, Reply, and Signal. The delivery message of the Method type represents invocation of a method of the receiving cores; the delivery message of the Reply type represents a reply to the invocation of a method of the receiving cores; the delivery message of the Method type corresponds to the delivery message of the Reply type; and the Signal type represents that the initiating core sends a signal to the receiving cores, and the receiving cores do not need to respond. The Wake up field represents the status of the delivery message, and represents whether the delivery message is available. The ACK field is a counter field for counting. The Param 1 field is used for recording the ID of a command. The Param 2 and Param 3 fields are reserved for storing other parameters, and their specific meanings can be defined as required. It should be understood that the above fields and meanings thereof are exemplary, and in actual implementation, the service may further include other fields.

As the delivery message according to the present disclosure is service-oriented and corresponds to interfaces of services, when the delivery message is distributed to the interfaces of the services to be invoked in the receiving core, functions of the interfaces of the services are invoked, so as to implement specific functions of the services in the receiving cores.

In an embodiment, the code to implement invocation of the initiating core, the code to implement invocation of the services in the receiving cores and the code to implement invocation, routing and parsing of the delivery message are uniformly generated by a code generator.

Figure 5:
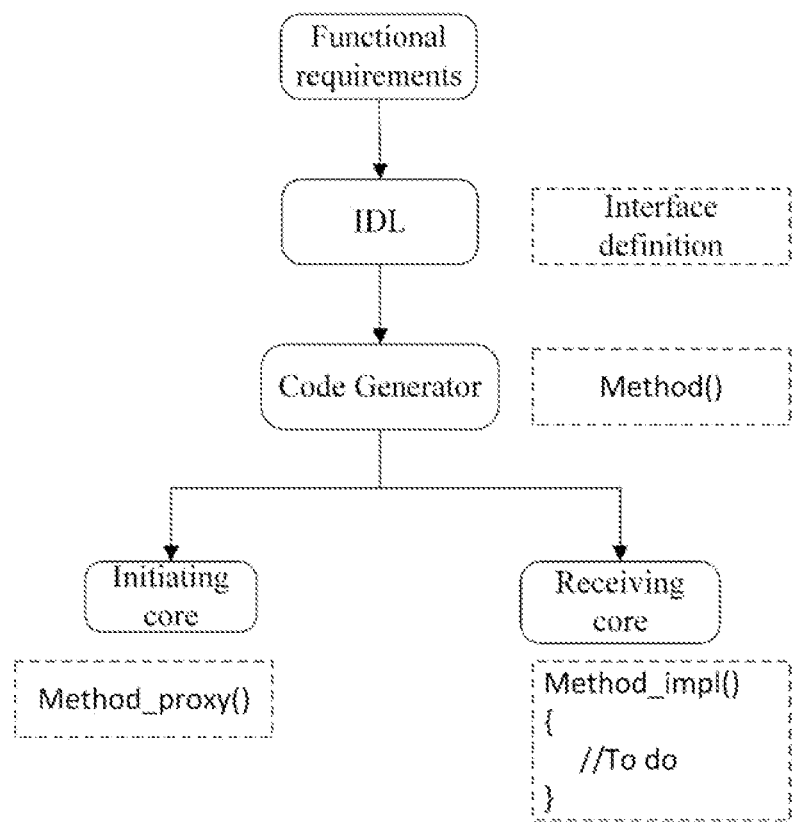
FIG. 5 is a schematic diagram of automatic generation of uniform interfaces and codes according to an embodiment of the present disclosure.

Referring to FIGS. 2 and 5, the code generator uniformly generates framework codes for inter-core communication as an inter-core communication framework. The inter-core communication framework is used to implement the communication details and functions such as invocation, routing, and parsing of the delivery message, and associate services in the cores. The codes of the inter-core communication framework are generated by the code generator. In particular, the code generator uniformly generates the code to implement invocation of the initiating core, the code to implement the interfaces of the services in the receiving cores and the code to implement invocation and routing of the delivery message. For example, as shown in FIG. 5, taking a service to be invoked being "method( )" as an example, the code generator generates a proxy (such as the Method . . . proxy( ) in FIG. 5) of the method( ) for an initiating core, for ease of invocation; at the same time, the code generator generates method ( ) implementation (such as the Method_impl ( ) in FIG. 5) for a receiving core, and the specific implementation needs to be completed by a programmer by coding according to requirements (the to do part in the Method_impl ( ) in FIG. 5).

When invoking interfaces of services of receiving cores by an initiating core, the inter-core communication framework parses the delivery message corresponding to the invocation, and sends the delivery message to the interfaces of the services to be invoked, so that the interfaces of the services are invoked.

In a preferred embodiment, the code generator has a version management function, and version information can be added to the generated codes, so that the codes can be traced, thereby facilitating debugging.

In the described embodiment, the code generator is used to uniformly generate codes for the initiating core, the receiving cores and the inter-core communication framework, so that the consistency of communication protocols between the initiating core and the receiving cores can be guaranteed, and the problem caused by protocol mismatch in conventional handwriting of codes can be avoided. In addition, version information is added to the generated codes, so that the codes can be maintained more easily.

In an embodiment, the method for inter-core communication according to the present disclosure further comprises allocating, according to a predetermined rule, hardware resources required for communication between the initiating core and the receiving cores to the initiating core and the receiving cores.

In this embodiment, during inter-core communication, a core loaded with an inter-core communication service allocates hardware resources according to actual inter-core communication situations, thereby implementing real-time allocation of hardware resources. Therefore, it is not necessary to define resource usage boundaries of each core in advance in order to avoid resource collision. Thus efficient utilization of system resources can be realized.

In an embodiment, a plurality of receiving cores exist, each of the receiving core periodically reports its resource usage situation to an inter-core communication service, and the inter-core communication service determines the receiving cores to be invoked according to the service invocation situation of the initiating core and the resource usage situation, thereby achieving the purpose of load balance management. Specifically, each receiving core comprises a status service, and the receiving core periodically reports its resource usage situation to the inter-core communication service by means of the status service.

It should be understood that interfaces of services in a plurality of receiving cores have a uniform interface format.

Exemplarily, as shown in FIG. 2, in a multi-core processor comprising a plurality of DSP and ARM cores, each DSP provides a calculation service with the same function for calculation of neural network data. There are a plurality of application programs on the ARM core needing to invoke the calculation service provided by the DSP core. The inter-core communication service calculates the load of each DSP according to the resource usage situation reported periodically by each DSP core through the status service. When the application program of the ARM core invokes the calculation service of the DSP core, a calculation task is allocated according to the load, so as to achieve the purpose of load balance management.

A specific process of the method for inter-core communication according to the present disclosure is described below with reference to FIGS. 6 and 7. According to the method for inter-core communication of the present disclosure, the invocation of interfaces of services in receiving cores is implemented by means of the transmission of a delivery message. In an exemplary embodiment, the transmission of the delivery message includes a unicast mode and a broadcast mode. FIG. 7 is a sequence diagram of transmission of a delivery message in a unicast mode, and FIG. 8 is a sequence diagram of transmission of a delivery message in a broadcast mode.

Figure 6:
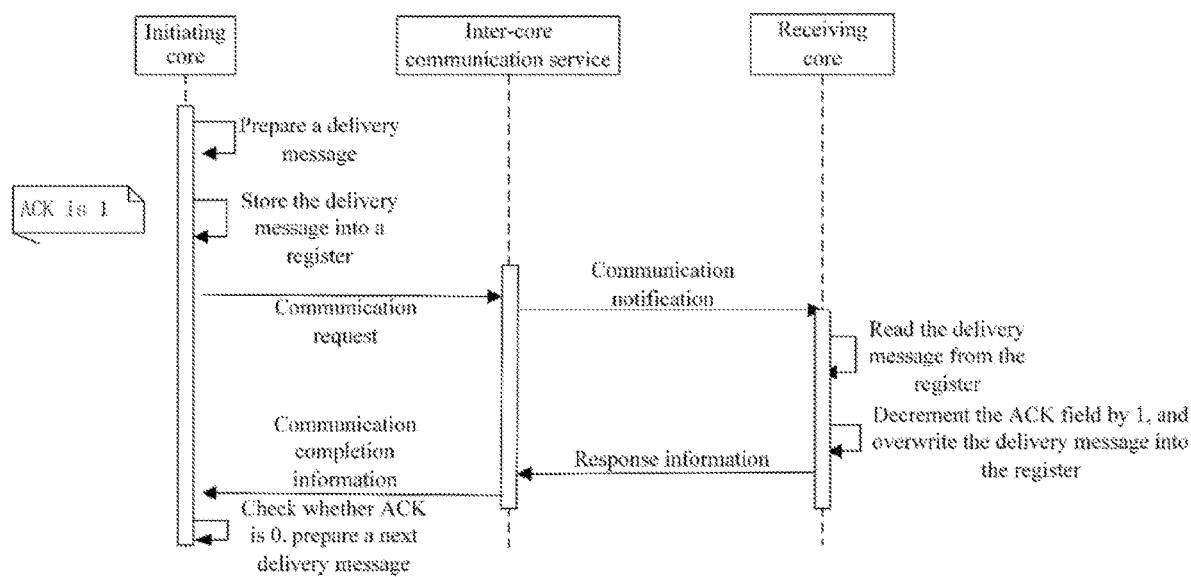
FIG. 6 is a sequence diagram of transmission of a delivery message according to an embodiment of the present disclosure.
Figure 7:
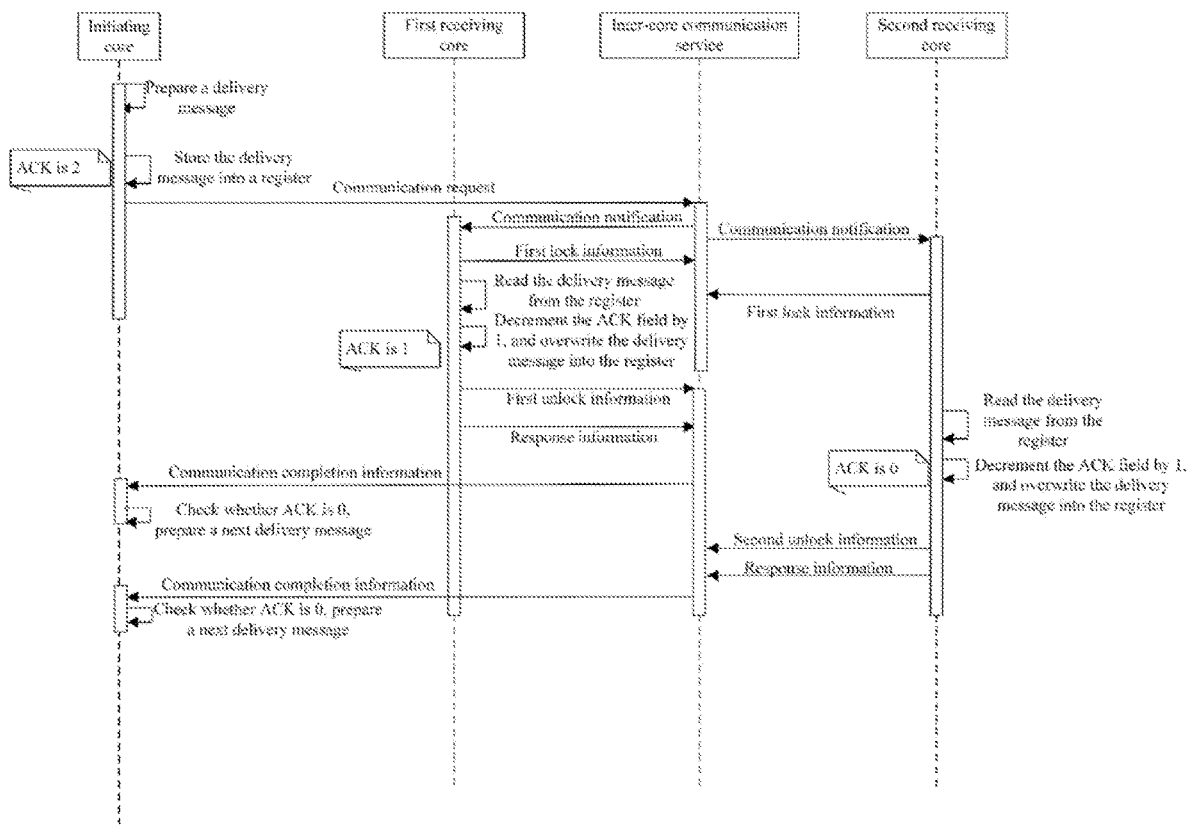
FIG. 7 is a sequence diagram of transmission of a delivery message according to an embodiment of the present disclosure.
Figure 8:
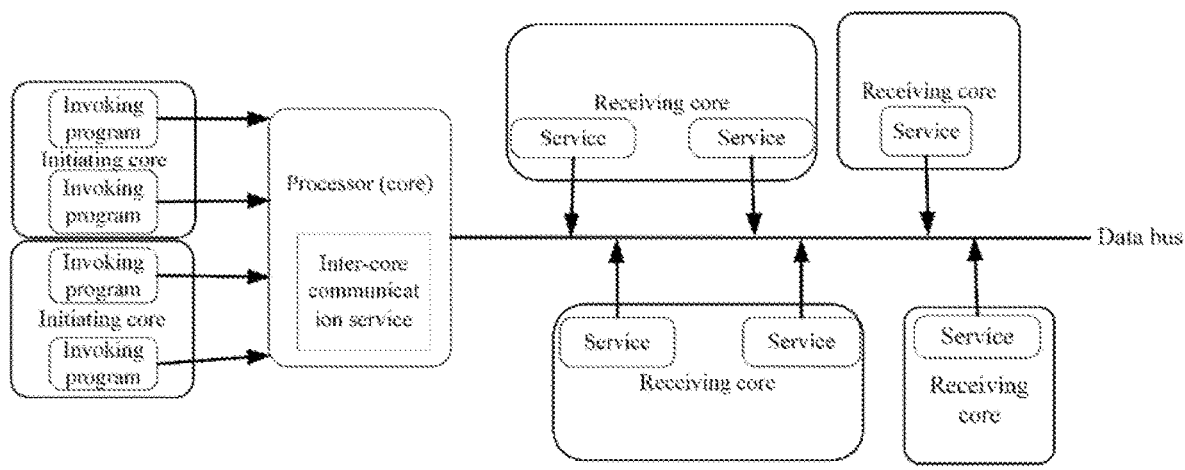
FIG. 8 is a schematic block diagram of an inter-core communication system according to an embodiment of the present disclosure.

As shown in FIGS. 6 and 7, referring to FIG. 3 together, in step S20, instructing, on the basis of the communication request, the initiating core to communicate with the receiving cores by using a delivery message to invoke interfaces of services in the receiving cores specifically comprises:

sending a communication notification to the receiving cores on the basis of the communication request, the communication notification being used to instruct the receiving cores to read a delivery message delivered by the initiating core to the receiving cores;

receiving response information sent by the receiving cores after reading the delivery message; and sending communication completion information to the initiating core on the basis of the response information.

Further, prior to receiving a communication request sent by the initiating core for communication with the receiving cores, the initiating core prepares a delivery message to be delivered to the receiving cores and stores the delivery message into a register of the initiating core. Preferably, a counter field in the delivery message is set to the number of the receiving cores.

The communication notification is further used to instruct the receiving cores to modify the delivery message so as to decrement the counter field in the delivery message by 1 and to overwrite the modified delivery message into the register of the initiating core.

Further, the communication completion information is also used to instruct the initiating core to check whether the counter field of the delivery message stored in the register is 0, and if the counter field is 0, the initiating core prepares a next delivery message to be delivered to the receiving cores, and stores the next delivery message into the register of the initiating core.

Exemplarily, FIG. 6 shows a sequence diagram of a method for inter-core communication in which a delivery message is transmitted in a unicast mode. The unicast mode means that the initiating core sends the delivery message only to one receiving core so as to communicate with one receiving core. When the initiating core needs to invoke services of the receiving cores, the initiating core first prepares a delivery message to be delivered to the receiving cores, stores the delivery message in a register of the initiating core, and sets an ACK field of the delivery message to the number (1 in the unicast mode) of the receiving cores to which the delivery message is to be delivered. Wherein each of the initiating core and the receiving cores has a register with a size of 64 bits for storing the delivery message. In an embodiment of the present disclosure, the length of a service is 64 bits, and the delivery message corresponds to the interface of the service; therefore, in an embodiment of the present disclosure, the length of the delivery message is also 64 bits. It should be understood that depending on the specific implementations of different services, the services and the delivery message may be of other lengths, and the registers may be registers of other sizes, which are not limited in the present disclosure. The initiating core then sends a communication request to an inter-core communication service, which is a service loaded on a particular core to execute. The inter-core communication service sends a communication notification to the receiving core on the basis of the received communication request. After receiving the communication notification, the receiving core reads the delivery message from the register of the initiating core, whereby the delivery message is sent to the interface of the service to be invoked in the receiving core, and the interface is invoked to perform the service in the corresponding receiving core. After reading the delivery message from the register of the initiating core, the receiving core decrements the ACK field in the delivery message by 1, and overwrites the modified delivery message into the register of the initiating core. The receiving core sends a response message to the inter-core communication service after reading and modifying the delivery message, and the inter-core communication service sends communication completion information to the initiating core on the basis of the received response message. The initiating core checks whether the ACK field of the delivery message in the register is 0 on the basis of the received communication completion information, and if the ACK field is 0, the initiating core continues to prepare a next delivery message, thereby completing a single unicast delivery of the delivery message.

FIG. 7 shows a sequence diagram of a method for inter-core communication in which a delivery message is transmitted in a broadcast mode. The broadcast mode means that the initiating core sends the delivery message to a plurality of receiving cores so as to communicate with the plurality of receiving cores. The operation of each receiving core in the broadcast mode is similar to that in the unicast mode, and for brevity of description, the following embodiment only describes differences between the broadcast mode and the unicast mode.

In this embodiment, the method for inter-core communication further comprises: receiving lock information sent by the receiving cores after receiving the notification information, wherein the lock information indicates that the receiving cores execute a lock operation on the register, and only the receiving cores executing the lock operation on the register can read/write data from/into the register.

In addition, prior to receiving response information sent by the receiving cores after reading the delivery message, the method for inter-core communication according to this embodiment further comprises: receiving unlock information sent by the receiving cores after modifying the delivery information, the unlock information being used to indicate that the register is unlocked, so as to allow other receiving cores to read/write data from/into the register.

Exemplarily, as shown in FIG. 7, the number of receiving cores is 2, but it should be understood that the present disclosure is not limited thereto, and more receiving cores may also be provided. When invoking services in a first receiving core and a second receiving core, an initiating core prepares a delivery message to be delivered to the first receiving core and the second receiving core and stores the delivery message into a register of the initiating core, and sets an ACK field in the delivery message to 2. Then, the initiating core sends a communication request for communication with the first receiving core and the second receiving core to an inter-core communication service, and the inter-core communication service sends a communication notification to the first receiving core and the second receiving core on the basis of the received communication request. After receiving the communication notification, the first receiving core and the second receiving core respectively execute a lock operation on the register of the initiating core, and send lock information to the inter-core communication service. The register can only be locked by one receiving core at one time, and when the register receives the lock operation to be executed thereupon by a plurality of receiving cores, the register is successively locked by the plurality of receiving cores according to the order of receiving the lock operation. In the embodiment shown in FIG. 8, the first receiving core sends first lock information to the inter-core communication service, the second receiving core sends second lock information to the inter-core communication service, and the first receiving core executes the lock operation on the register prior to the second receiving core. Thus, in this example, the register is first locked by the first receiving core. During locking of the register by the first receiving core, only the first receiving core can read/write data from/into the register, and other cores cannot read/write data from/into the register. The first receiving core then reads a delivery message from the register, whereby the delivery message is sent to the interface of the service to be invoked in the first receiving core, and the interface is invoked to execute the service in the corresponding first receiving core. After reading the delivery message from the register, the first receiving core decrements the ACK field in the delivery message by 1, and overwrites the modified delivery message into the register of the initiating core. At this time, the ACK field in the delivery message is 1. The first receiving core sends first unlock information to the inter-core communication service after reading and modifying the delivery message, the first unlocking information indicating that the register is unlocked by the first receiving core, and other receiving cores can read/write data from/into the register. At this time, as the register is unlocked by the first receiving core, the second receiving core can read the delivery message from the register, whereby the delivery message is sent to the interface of the service to be invoked in the second receiving core, and the interface is invoked to execute the service in the corresponding second receiving core. After reading the delivery message from the register of the initiating core, the second receiving core decrements the ACK field in the delivery message by 1, and overwrites the modified delivery message into the register of the initiating core. It is understandable that the ACK field in the delivery message is 0 at this time. After the first receiving core and the second receiving core overwrite the modified delivery message to the register, the first receiving core and the second receiving core respectively send a response message to the inter-core communication service, and the inter-core communication service sends communication completion information to the initiating core on the basis of the received response message. The initiating core checks whether the ACK field of the delivery message in the register is 0 on the basis of the received communication completion information, and if the ACK field is 0, the initiating core continues to prepare a next delivery message.

In this embodiment, during the read/write operation performed by the receiving cores on the register, a lock operation is performed on the register, so as to prevent collision caused by a plurality of receiving cores simultaneously performing the read/write operation on the register, and enable a counter field in the delivery message to accurately indicate invocation situations of the receiving cores.

In the sequence of the method for inter-core communication in FIG. 6 and FIG. 7, the execution order of the operations is represented from top to bottom. However, other execution orders may also exist without technical contradiction.

In a preferred embodiment, as mentioned above, each receiving core comprises a status service, and the receiving core periodically reports its resource usage situation to an inter-core communication service by means of the status service. Specifically, the inter-core communication service may periodically receive load status information sent from each of the receiving cores; determine, on the basis of the load status information, a first receiving core of the plurality of receiving cores to receive the communication notification; and send the communication notification only to the first receiving core to instruct the first receiving core to read a delivery message delivered by the initiating core to the receiving cores. In this embodiment, the first receiving core may be a receiving core with less load, and there may be one or more receiving cores, thereby achieving the purpose of load balance management.

According to another aspect of the present disclosure, provided is a processor, configured to execute a computer program stored on a memory, wherein the processor, when executing the computer program, implements the method for inter-core communication in the described embodiments.

The processor may be one of a plurality of processing cores of a multi-core processor.

Alternatively, the processor is a scheduling processor, the scheduling processor being used to schedule resources of the plurality of processing cores of the multi-core processor.

According to another aspect of the present disclosure, as shown in FIG. 8, provided is an inter-core communication system, comprising the processor according to the above aspect, and the initiating core and receiving cores. The processor is loaded with an inter-core communication service, and is configured to execute the method for inter-core communication in the described embodiments.

As shown in FIG. 8, each core registers with a data bus according to uniform standards, and when an initiating core invokes services in receiving cores, the receiving cores to be invoked are found by using an inter-core communication service loaded on the cores of a processor, and communication with the receiving cores is performed by using a delivery message to invoke interfaces of the services in the receiving cores.

All the services in the receiving cores and the invoking programs of the initiating core have explicit interfaces, explicit methods of use, and are encapsulated in user programs in the cores. In the service invocation process, the initiating core does not need to know the locations of the receiving cores, implementation details, etc.

In the inter-core communication system, the invoking interface of the initiating core and the interfaces of the services in the receiving cores have a uniform interface format and a uniform communication protocol, preferably defined by IDL.

In a preferred embodiment, the code to implement invocation of the initiating core, the code to implement invocation of the services in the receiving cores, and the code to implement invocation, parsing, and routing of the delivery messages are uniformly generated by a code generator. That is, the code generator uniformly generates framework codes for inter-core communication as an inter-core communication framework. The inter-core communication framework is used to implement the communication details and functions such as invocation, routing, and parsing of the delivery message, and associate services in the cores. Preferably, the codes generated by the code generator may include version information to facilitate version management of the codes.

Various technical features of the described embodiments can be combined in any way, and in order to make the description brief, not all the possible combinations of the technical features in the described embodiments are described. However, as long as the combinations of these technical features are not contradictory, all the combinations should be considered to belong to the scope of the description.

The described embodiments merely represent several implementations of the present disclosure, and are described in detail, but are not intended to limit the scope of the present disclosure. It should be noted that, for those skilled in the art, various modifications and improvements can be made without departing from the concept of the present disclosure, and all these modifications and improvements belong to the scope of protection of the present disclosure. Therefore, the scope of protection of the present disclosure should be defined according to the appended claims.

What is claimed is:

1. A method for inter-core communication of a multi-core processor, the multi-core processor comprising a plurality of processor cores, among which an initiating core initiates communication with receiving cores, wherein the method comprises;
   receiving a communication request sent by the initiating core for communication with the receiving cores; and
   instructing, on the basis of the communication request, the initiating core to communicate with the receiving cores by using a delivery message to invoke interfaces of services in the receiving cores;
   periodically receiving load status information sent from each of the receiving cores;
   determining, on the basis of the load status information, a first receiving core of the plurality of receiving cores to receive the communication notification;
   sending the communication notification only to the first receiving core to instruct the first receiving core to read a delivery message delivered by the initiating core to the receiving cores;
   wherein the delivery message is service-oriented and corresponds to the interfaces of the services in the receiving cores; and
   wherein the instructing, on the basis of the communication request, the initiating core comprises:
      sending a communication notification to the receiving cores on the basis of the communication request, the communication notification being used to instruct the receiving cores to read a delivery message delivered by the initiating core to the receiving cores;

receiving response information sent by the receiving cores after reading the delivery message; and sending communication completion info ration to the initiating core on the basis of the rest once information.

2. The method according to claim 1, wherein the initiating core comprises an invoking interface, the invoking interface being used to invoke the services in the receiving cores; and the invoking interface of the initiating core and the interfaces of the services in the receiving cores have a uniform interface format and a uniform communication protocol.

3. The method according to claim 2, further comprising a code to implement invocation of the initiating core, a code to implement invocation of the services in the receiving cores and a code to implement invocation, parsing and routing of the delivery message are uniformly generated by a code generator.

4. The method according to claim 1, further comprises:

allocating, according to a predetermined rule, hardware resources, which are required for communications between the initiating core and the receiving cores, to the initiating core and the receiving cores.

5. The method according to claim 1, wherein, prior to receiving a communication request sent by the initiating core for communication with the receiving cores, the delivery message is stored in a register of the initiating core, and a counter field in the delivery message is Set to the number of the receiving cores; and the communication notification is further used to instruct the receiving cores to modify the delivery message so as to decrement the counter field in the delivery message by 1 and to overwrite the modified delivery message into the register.

6. The method according to claim 5, wherein the method further comprises:

receiving lock information sent by the receiving cores after receiving the notification information, wherein the lock information indicates that the receiving cores execute a lock operation on the register, and only the receiving cores executing the lock operation on the register can read/write data from/into the register; and prior to receiving response information sent by the receiving cores after reading the delivery message, the method further comprises:

receiving unlock information sent by the receiving cores after modifying the delivery information, the unlock information being used to indicate that the register is unlocked, so as to allow other receiving cores to read/write data from/into the register.

7. The method according to claim 5, wherein, the notification completion information is used to instruct the initiating core to check whether the counter field of the delivery message stored in the register is 0; and the method further comprises:

if the counter field is 0, causing the initiating core to store a next delivery message into the register.

8. A processor, configured to execute a computer program stored in a memory, wherein the processor executes the computer program to implement the method according to claim 1.

9. The processor according to claim 8, wherein the 1 processor is one of the plurality of processing cores of the multi-core processor.

10. The processor according to claim 8, wherein the processor is a scheduling processor, the scheduling processor being used to schedule resources of the plurality of processing cores of the multi-core processor.

11. An inter-core communication system, comprising the processor according to claim 8, and the initiating core and the receiving cores.

12. A non-transitory computer readable storage medium, storing a computer program, and the computer program, when executed, causing a processor to implement the method according to claim 1.

* * * * *